United States Patent [19]

Yamashita et al.

[11] 3,910,689
[45] Oct. 7, 1975

[54] REAR VIEW MIRROR APPARATUS HAVING ROLL-TYPE FILTER MEANS FOR AUTOMOBILE

[75] Inventors: Makoto Yamashita, Kanagawa; Masagoro Kushida, Isehara; Fumio Niitsuma, Hatano; Masao Enomoto, Yokohama; Akira Miyamoto, Tokyo, all of Japan

[73] Assignee: Ichikoh Industries Limited, Tokyo, Japan

[22] Filed: Feb. 5, 1974

[21] Appl. No.: 439,768

[30] Foreign Application Priority Data
Feb. 7, 1973 Japan.................. 48-14813

[52] U.S. Cl.................. 350/302; 350/283
[51] Int. Cl.².................. G02B 5/08
[58] Field of Search.......... 350/276, 277, 283, 284, 350/301, 302, 311, 315–317, 318

[56] References Cited
UNITED STATES PATENTS
3,603,672  9/1971  Bastide.................. 350/283
3,773,406  11/1973  Baumgardner.................. 350/302

Primary Examiner—Alfred E. Smith
Assistant Examiner—Michael J. Tokar
Attorney, Agent, or Firm—Cushman, Darby & Cushman

[57] ABSTRACT

A rear view mirror apparatus having roll-type filter means for automobile, capable of altering the brightness of image or capable of adding reference lines on the image, as required. This apparatus has, during the paths of light rays coming from an object to the eyes of the driver, a flexible ribbon of filter arranged for being freely reeled and unreeled as desired. This ribbon of filter is prepared so as to have portions of different transmittancies of light rays for different purposes and has reference lines printed on the surface of this ribbon. This apparatus is arranged so that the driver can have a view of the object through any desired portion of the flexible filter ribbon by reeling or unreeling this ribbon.

5 Claims, 10 Drawing Figures

REAR VIEW MIRROR APPARATUS HAVING ROLL-TYPE FILTER MEANS FOR AUTOMOBILE

BACKGROUND OF THE INVENTION a. Field of the invention:

The present invention pertains to an improvement in rear view mirror apparatuses for automobiles.

b. Description of the prior art:

Known rear view mirror apparatuses, whether they may be an ordinary type installed in the driver's chamber or they may be a rear view mirror apparatus of periscope type, are arranged only to obtain a rear view by relying merely on the reflection of light rays at the mirror surface or surfaces. It is, accordingly, hardly possible with such mirror apparatuses of the prior art to alter the amount of light rays incident to the driver's eyes as required or to enable the driver to confirm the distance between his automobile and the following vehicle. In the past, the amount of incident light rays have been changed stepwise only by the use of a device such as a prism mirror. In case a prism mirror is employed, however, the amount of incident light rays can be changed only in two steps, and accordingly, no sufficient effect could be expected of such an apparatus in an actual driving. Furthermore, a prism mirror per se is bulky and heavy, and this fact in turn is dangerous in that when the driver hits his head against the prism mirror at an accident, the driver is susceptible to sustaining a serious injury.

SUMMARY OF THE INVENTION

It is, therefore, the object of the present invention to provide a rear view mirror apparatus for automobile having a structure which is capable of altering the brightness of the image and to add reference lines on the image, as required.

In order to attain this object, the rear view mirror apparatus of the present invention has, during the paths of light rays from the object to the driver's eyes, a flexible ribbon of filter arranged so as to be freely reeled or unreeled as required. This ribbon of filter is prepared so as to have portions of different transmittancies of light rays for different purposes and has reference lines printed on the surface of the ribbon of filter. This apparatus is arranged so that the driver can have a view of the object through any portion or portions or through any desired area or areas of such a portion of the filter ribbon by reeling and unreeling this ribbon.

Accordingly, it is another object of the present invention to enhance the safety of traffic of automobiles by providing a rear view mirror apparatus having various many properties by the interposition of a freely reelable and unreelable ribbon of filter in the paths of light rays incident to the eyes of the driver.

DETAILED DESCRIPTION OF THE PREFERRED EMBODIMENTS

Figure 1:
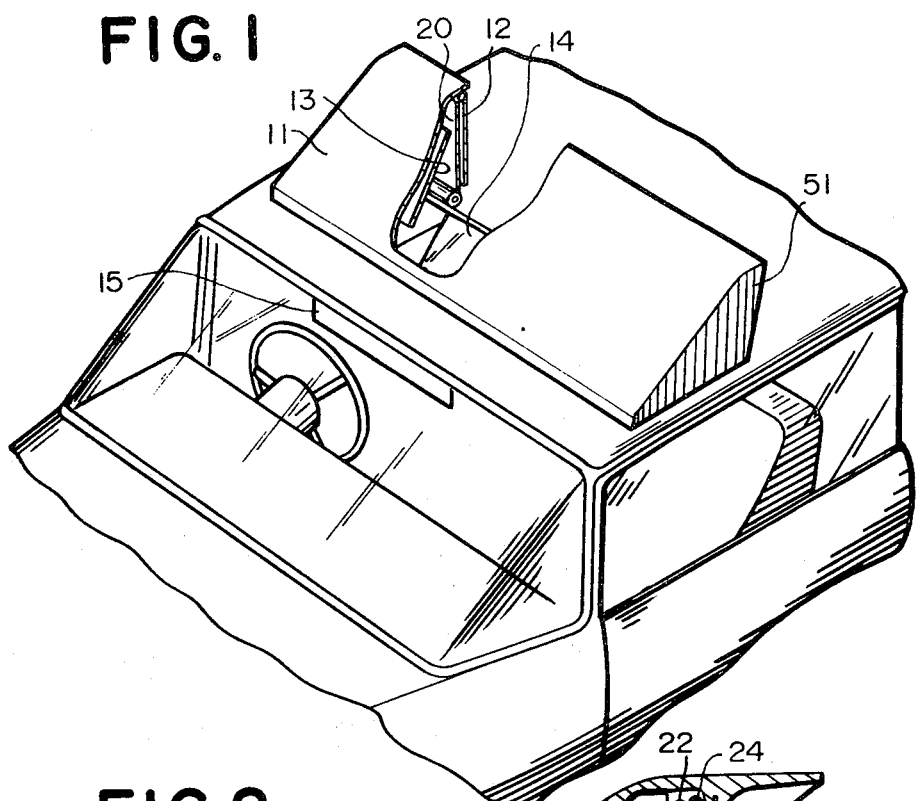
FIG. 1 is a fragmentary perspective view of an automobile equipped with an example of the periscope type rear view mirror apparatus of the present invention, showing said apparatus partly broken away.
Figure 2:
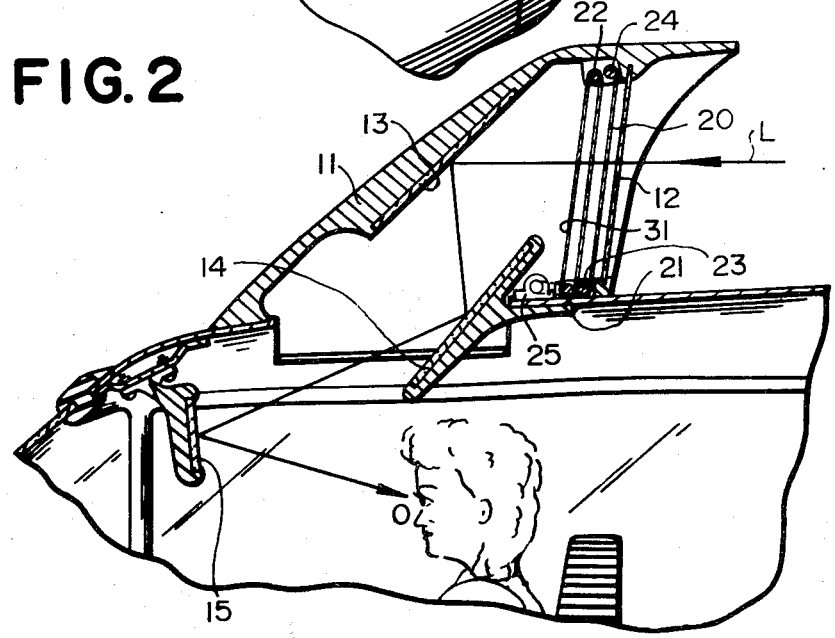
FIG. 2 a central vertical sectional view of the rear view mirror apparatus of FIG. 1.

FIGS. 1 and 2 show an example of the periscope type rear view mirror apparatus according to the present invention.

In this example, the apparatus is of the following arrangement. The light rays L pass through a glass pane 12 covering the rear opening of the housing 11 projecting on top of the driver's chamber, and are reflected at the surface of an objective mirror 13 secured to the front side of the inner wall of the housing 11. These reflected light rays are then reflected to advance forwardly at a reflecting mirror 14 secured to the rear edges of the aperture provided through the roof of the driver's chamber. The resulting light rays are finally reflected at the surface of the eye-piece mirror 15 hinged at a forward site of the upper inner wall of the driver's chamber to impinge onto the eyes O of the driver. A periscope type rear view mirror apparatus having the aforesaid arrangement is known.

Figure 3:
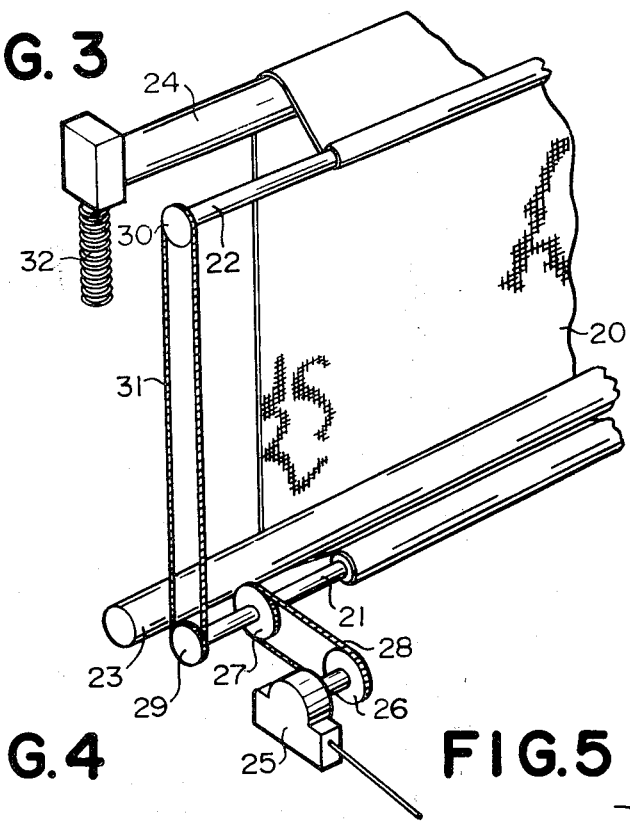
FIG. 3 is a perspective view of the filter ribbon reeling and unreeling mechanism employed in the example of FIG. 1.

In this example, however, a flexible ribbon of filter 20 for the passage of light rays L therethrough is provided on the inner side of and in parallel relation with the glass pane 12 of the rear view mirror apparatus having the aforesaid arrangement. This ribbon of filter 20 is arranged so as to be freely reeled and unreeled by the mechanism as shown in FIG. 2. More specifically, in FIG. 3, reference numerals 21 and 22 represent reeling shafts, 23 and 24 represent tension rolls, and 25 represents an electric motor, respectively. A toothed wheel 26 fixed to the driving shaft of the electric motor 25 is coupled to a toothed wheel 27 fixed to the reeling shaft 21 by a chain 28. Accordingly, arrangement is provided so that as the reeling shaft 21 is rotated by this motor 25, the ribbon of filter 20 is reeled. A toothed wheel 29 which is fixed to the reeling shaft is coupled by a chain 31 to a toothed wheel 30 having a diameter identical with that of the toothed wheel 29 and fixed to the reeling shaft 22, thereby enabling them to rotate in synchronism. Said tension roll 24 is supported by a compression spring 32 to insure that the ribbon of filter 20 is rendered tight always between these two tension rolls 23 and 24. Also, the electric motor 25 is arranged so that it can be driven by the manipulation of a switch means by the driver in his chamber. This motor 25 is also arranged so that the direction of rotation can be altered by the manipulation of this switch means. Because of the foregoing arrangements, it is possible to move the ribbon of filter 20 in either direction as desired while keeping this ribbon of filter 20 tight between these two tension rolls 23 and 24.

Figure 4:
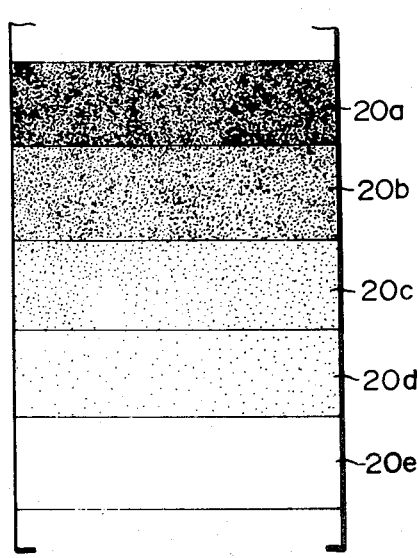
FIGS. 4 to 8 are explanatory representation showing a type of filter ribbon which can be employed in the example of FIG. 1.

As such, let us now assume that, in the aforesaid example, the flexible ribbon of film 20 is provided with portions having different transmittancy of light rays relative to each other as shown in FIG. 4. Then, by positioning between the two tension rolls 23 and 24 the portion of the ribbon of filter having a desired transmittancy of light rays by moving this ribbon of filter 20, it is possible to alter the transmittancy of light rays of this rear view mirror apparatus as a whole to a desired magnitude. Accordingly, it is possible to impart this apparatus an ideal dazzlement-preventive effect by the selection of a transmittancy of light rays suitable for the condition outside the automobile. For example, the portion 20a of the ribbon of filter having the lowest transmittancy of light rays (a transmittancy of 3–4%) is utilized when the apparatus is exposed to the irradiation of head lights of the following vehicle at a relatively close distance therefrom on a road such as a highway. The portion 20e having the maximum transmittancy is utilized on a rainy day or at dusk or during the daytime when the sunlight is weak. When driving along a coast in mid-summer or on a snow-covered road on a shiny day, or when driving a street at night, those portions 20b, 20c or 20d having intermediate transmittancies may be utilized.

Figure 5:
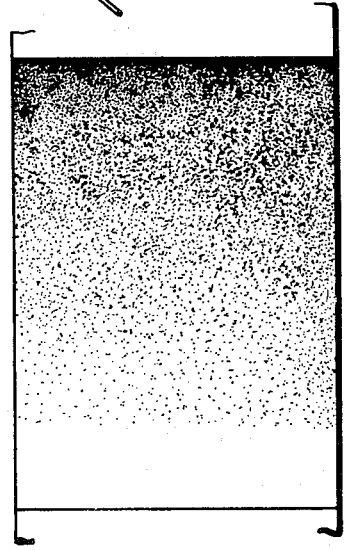

In order to give the ribbon of filter 20 a dazzlement-preventive effect, a filter prepared to have a progressively altering transmittancy of light rays as shown in FIG. 5 may be used.

Figure 6:
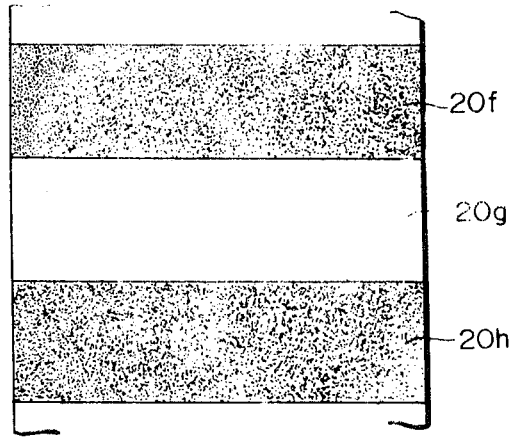

Also, the ribbon of filter 20 may have portions allowing the passage therethrough of only those light rays having a specific frequency (wavelength) or inhibiting the passage therethrough of only those light rays having a specific frequency (wavelength), as shown in FIG. 6. This is because of the following considerations. The light rays contained in the light source may differ in frequency characteristic between one light source and another. Therefore, when a real dazzlement-preventive effect is taken into account, it will be ideal to provide a rear view apparatus having a filter which is capable of only lowering the transmittancy of light rays evenly as stated above, but having a filter which can prevent dazzlement by eliminating only those detrimentary wavelengths but allowing the passage therethrough of as much light rays of other frequencies as possible, thereby not hampering the driver's exact recognition of the rear view. For example, the portion 20f is given the property to shut off mainly the ultra-violet ray range (4000–3000 A) so that this portion is utilized in driving a coast in mid-summer or on a snowed road on a shiny day to protect the driver's eyes. Also, the portion 20g which is prepared to cut off the infrared ray range (7000–9000 A) is utilized in driving at night to cut off the infrared ray range of the light rays which is abundant in head lights of automobiles. Furthermore, the portion 20h is provided with a property of allowing the passage therethrough of only those light rays having a wavelength in the vicinity of those wavelengths to which the human eyes are highly sensitive. Therefore, this portion 20h is utilized when it is somewhat dark such as at dusk or on a rainy day to enhance the visibility.

Figure 7:
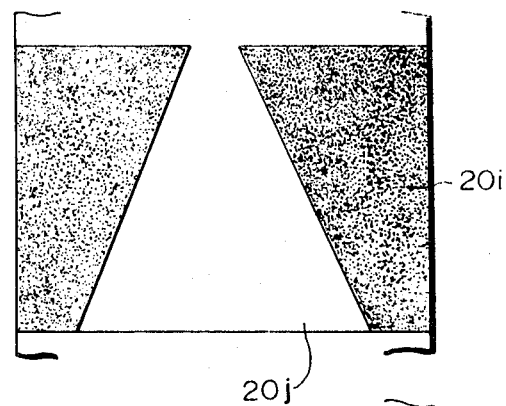

In FIG. 7 is shown a further modified example of filter portion in which areas 20i and 20i for shutting off light rays are provided on both marginal sides of the filter ribbon in such a manner that the central area 20j for allowing the passage of light rays has a progressively altering breadth. By moving this ribbon of filter, it is also possible to alter the range of field of vision obtained. This modified filter portion is based on the following considerations. That is, as the roads having broad widths are constructed of late, there are provided rear view mirror apparatuses accomodating a wide field of view. In case, however, a rear view mirror apparatus having such a wide field of view is used in driving on a narrow road, it may occur that unnecessary information distracts the attention of the driver, so that there may be the necessity to appropriately adjust the extension of field of vision.

Figure 8:
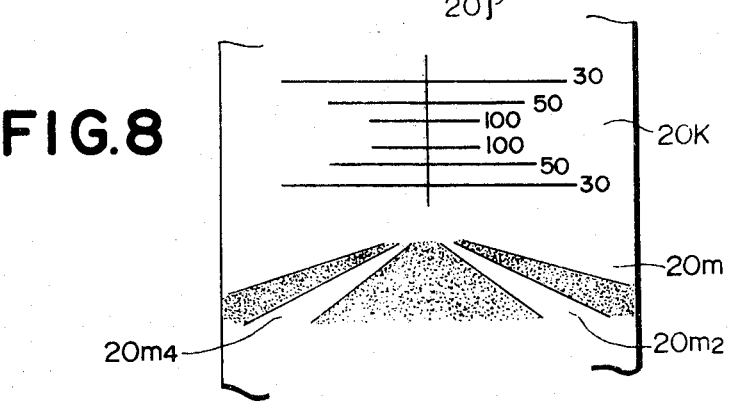

It is also possible to make a rough measurement of the distance between the driver's automobile and the following vehicle by providing a pattern like that shown at 20k in FIG. 8. More specifically, it should be understood first that small-sized vehicles have similar heights measured from ground, and besides the distance between the eyes of the driver and the filter is arranged to be substantially constant in these small vehicles. Therefore, it is possible to indicate the distance between two cars, i.e. the driver's car and the car running after the driver's car, as a length of scale on the filter surface.

According to the filter portion having a pattern or indications shown at 20m in FIG. 8, it is possible to make cognizance of the positions of the following vehicles running on the left side and the right side of the driver's automobile. For instance, let us now assume that the driver is driving on a five-lane side of a road. If the image of a vehicle which is running after the driver's automobile is positioned on the element indicated by $20m_2$, it will be known by the driver that this vehicle which is running after the driver's automobile is on the lane located on the adjacent right side of the driver's lane. This function of the filter is useful especially for beginner drivers since they have difficulty in getting hold of the exact position of the vehicles running after his car. If the elements or areas such as $20m_2$ or $20m_4$ which correspond to the adjacent next lanes are prepared to have specific colors such as yellow, it is possible to shorten the time required for the driver to recognize the vehicles which have entered these adjacent lanes, and thus the driving safety can be enhanced further. Those areas of the ribbon of filter which have been mentioned above may be superimposed as desired in use or any pattern of the filter may be superimposed with another pattern on a single filter. For example, the ribbon of filter shown in FIG. 4 may be superimposed on the ribbon of filter shown in FIG. 7 when in use. As a result, the two ribbons of filter which are superposed one upon another can display both of the dazzlement effect and the view field adjustment effect at the same time.

As the materials of such filters, it is possible to use Tetoron (commercial name), vinyl chloride or polyester. The provision of patterns for alteration of transmittancy of light rays and the provision of specific patterns on the filter can be performed by relying on known vacuum deposition technique, printing technique or painting technique. It is also possible to give the ribbon of filter a specific property by joining one edge of a certain ribbon of filter in one edge of a different ribbon of filter of the present invention.

Figure 9:
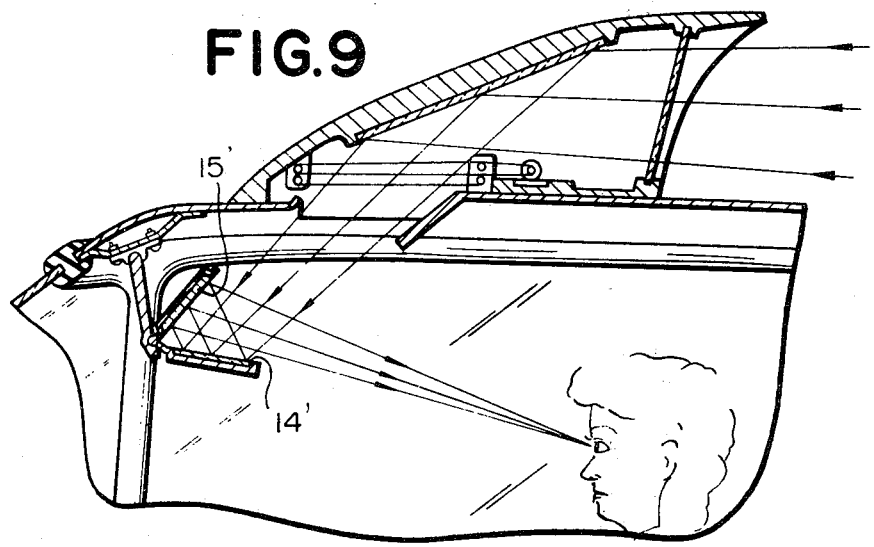
FIG. 9 is a modified example of the apparatus of FIG. 1.
Figure 10:
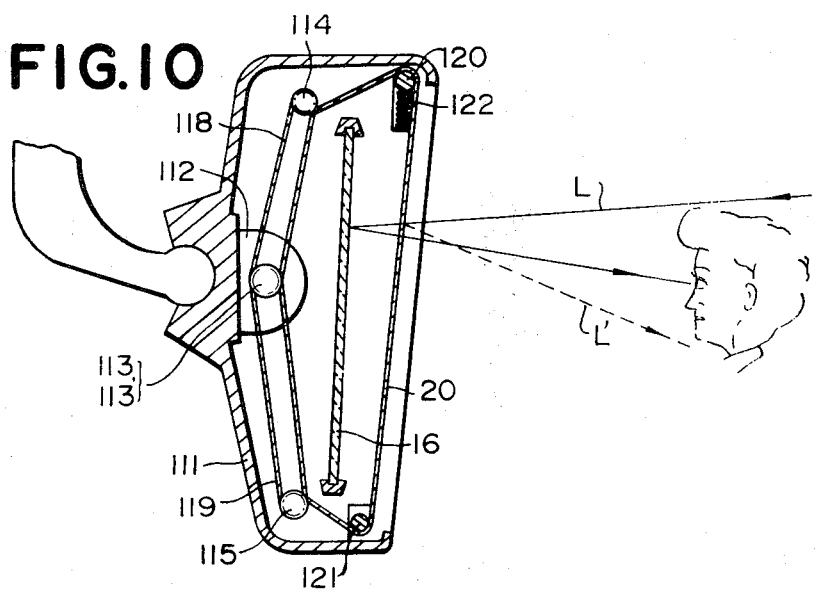
FIG. 10 is a central vertical sectional view showing another example of the present invention.

The flexible ribbon of filter according to any type discussed above may be provided above the aperture formed through the upper wall of the driver's chamber, in the manner as shown in FIG. 9, in a periscope type rear view mirror apparatus having an optical system wherein a reflecting mirror 14' is attached close to an eye-piece mirror 15' forming substantially a V-shape.

The flexible ribbon of filter according to the present invention further may be provided along the front surface of a rear view mirror 16 of the type designed for installation in the driver's chamber, as shown in FIG.

10. More specifically, in such an instance the mirror housing 111 for supporting a rear view mirror 16 has a relatively large size and an electric motor 112 is mounted on the inner wall behind the rear view mirror 16. Toothed wheels 113 and 113' both having the same diameter are secured onto the driving shaft of this motor 112. These toothed wheels are coupled by chains 118 and 119 to the toothed wheels of the reeling shafts 114 and 115, respectively, one of which shafts is provided above said motor and the other is provided below this motor, both of said toothed wheels 114 and 115 having the same diameter. Because of this arrangement, the reeling shafts 114 and 115 will be rotated in synchronism. On the other hand, on the upper portion and the lower portion of the foreground of the mirror face are mounted tension shafts 120 and 121, respectively, so that the ribbon of filter 20 is reeled and unreeled by the reeling and unreeling shafts 114 and 115 under tensioned state between these tension shafts. Also, between the tension shaft 120 and the mirror housing 111 is provided a compression spring 122 so that the tension shaft 120 is normally urged upwardly with a constant force. As a result, the ribbon of filter 20 located between the tension shafts 120 and 121 is always kept in a tensioned flat state.

In this example, the incident light rays L are passed through the filter 20 twice, that is, prior to impinging onto the mirror face 16 and after reflection at this mirror face. Therefore, if the light ray transmittancy of the filter 20 is assumed to be 30% and the reflection rate of the mirror 16 is 80%, then the amount of light rays arriving at the eyes of the driver will be $$A \times \frac{30}{100} \times \frac{80}{100} \times \frac{30}{100} = 0.072A$$

when the amount of the light rays is designated at A. Thus, there can be provided a light ray mitigating effect identical with that obtained from two superimposed portions of a ribbon of filter having an identical transmittancy of light rays in the preceding example. Likewise, in case a ribbon of filter having a pattern as shown in FIG. 7 is used in this instant example, there will develop staggered doubled images of the pattern. Thus, in reality it is impossible to utilize a ribbon of filter having such a pattern. Moreover, it is necessary to take into consideration the effect of reflection at the position of the surface of the filter. More specifically, in case the mirror face is arranged to be parallel with the surface of the filter, the same incident light rays are reflected first at the surface of the filter and then at the mirror face to produce staggered double images. Therefore, in order to insure that the light rays L' reflected at the surface of the filter do not impinge onto the eyes of the driver, the ribbon of filter has to be inclined as shown. Such problem of staggered double images can be avoided also by having the ribbon of filter tightly adhered to the mirror face.

It should be understood that the reeling and unreeling of the ribbon of filter may be performed manually instead of by a motor.

We claim:

1. In a rear view mirror apparatus for an automobile comprising:

a rear view mirror housing installed in the driver's chamber, a reflecting mirror mounted in the housing for receiving and reflecting light images, and filter means mounted within the housing in the path of light images received by and reflected from said mirror for filtering said images;

said filter means including a pair of reeling members, a tensioning means associated with said reeling members for urging said members apart, a flexible light-transmitting ribbon extending between said members for being reeled and unreeled to present different portions having different light transmittances thereof to said light images, a motive power generating means actuated by a power source coupled operatively to said reeling members for causing reeling and unreeling;

the improvement wherein said tensioning means comprises a pair of tension rolls and a compressible spring means for supporting and biasing one of said tension rolls away from the other, and said tension rolls are disposed in the upper and lower foreground of said reflecting mirror, respectively, so as to locate and hold that portion of said ribbon applied between said tension rolls in front of said reflecting mirror, in a tensioned condition and in such a relationship that said portion of said ribbon is inclined with respect to the surface of said reflecting mirror, thereby controlling the amount of light rays reflected at said reflecting mirror and at the same time preventing those light rays reflected at the surface of said portion of said ribbon from impinging onto the eyes of the driver of the automobile.

2. A rear view mirror apparatus according to claim 1, said ribbon of the filter means having contiguous portions equal in size but different in light-transmittancy with each other.

3. A rear view mirror according to claim 1, said ribbon of the filter means having contiguous portions having light-transmittancies progressively altering from one portion to its adjacent next portion.

4. A rear view mirror apparatus according to claim 1, said ribbon of the filter means having portions allowing the passage therethrough of light rays having specific wavelengths, respectively.

5. A rear view mirror apparatus according to claim 1, said ribbon of the filter means having portions shutting off the lightrays having specific wavelengths, respectively.

* * * * *